(12) United States Patent
Rodrigues Mansano et al.

(10) Patent No.: US 12,500,443 B2
(45) Date of Patent: Dec. 16, 2025

(54) ENERGY HARVESTER TO CONVERT INCIDENT RADIO FREQUENCY ENERGY TO DIRECT CURRENT AS WELL AS A CORRESPONDING METHOD AND SENSOR COMPRISING THE ENERGY HARVESTER

(71) Applicant: NOWI ENERGY B.V., Delft (NL)

(72) Inventors: André Luís Rodrigues Mansano, Delft (NL); Omar Vince Link, Delft (NL); Simon Van Der Jagt, Delft (NL)

(73) Assignee: Nexperia B.V., Nijmegen (NL)

( * ) Notice: Subject to any disclaimer, the term of this patent is extended or adjusted under 35 U.S.C. 154(b) by 121 days.

(21) Appl. No.: 16/626,501

(22) PCT Filed: Jun. 27, 2018

(86) PCT No.: PCT/NL2018/050412
§ 371 (c)(1),
(2) Date: Dec. 24, 2019

(87) PCT Pub. No.: WO2019/004824
PCT Pub. Date: Jan. 3, 2019

(65) Prior Publication Data
US 2020/0119585 A1    Apr. 16, 2020

(30) Foreign Application Priority Data
Jun. 28, 2017 (NL) .................... 2019135

(51) Int. Cl.
*H02J 50/00* (2016.01)
*G01R 19/165* (2006.01)
(Continued)

(52) U.S. Cl.
CPC ...... *H02J 50/001* (2020.01); *G01R 19/16576* (2013.01); *G01R 27/2605* (2013.01); *H02J 50/20* (2016.02)

(58) Field of Classification Search
CPC . H02J 5/005; H02J 7/025; H02J 17/00; H01F 38/14; B60L 11/182
(Continued)

(56) References Cited

U.S. PATENT DOCUMENTS 7,138,911 B2 * 11/2006 Tyndall ............... B60C 23/0411
340/447
8,232,761 B1 * 7/2012 Thivierge .................. H02J 1/06
320/101

(Continued)

OTHER PUBLICATIONS

International Search Report for International Application No. PCT/NL2018/050412 filed on Jun. 27, 2018 on behalf of Nowi Energy B.V. Mail Date: Sep. 19, 2018. 5 pages.

(Continued)

*Primary Examiner* — Quan Tra
(74) *Attorney, Agent, or Firm* — Ruggiero McAllister & McMahon LLC (57) ABSTRACT

An energy harvester (RF) to convert incident radio frequency, RF, energy associated with an RF signal to direct current energy comprises a rectifier (5) comprising a pre-storage capacitor (4), wherein said rectifier is arranged to rectify said incoming RF energy (3), storing the RF energy into the pre-storage capacitor (4), followed by an energy transfer unit (6) comprising a storage output capacitor (8), the value of the storage output capacitor (8) is higher than the value of the pre-storage capacitor (4), the energy transfer unit is arranged to transfer said energy from the pre-storage capacitor into the storage output capacitor including a control unit (2).

13 Claims, 6 Drawing Sheets

(51) Int. Cl.
*G01R 27/26* (2006.01)
*H02J 50/20* (2016.01)

(58) Field of Classification Search
USPC .......................................................... 307/104
See application file for complete search history.

(56) References Cited

U.S. PATENT DOCUMENTS

| | | | | |
|---|---|---|---|---|
| 8,432,071 | B2* | 4/2013 | Huang | H02J 50/20 |
| | | | | 307/151 |
| 9,197,143 | B1 | 11/2015 | Townsend et al. | |
| 9,559,605 | B2* | 1/2017 | Gudan | H02J 7/025 |
| 10,333,399 | B2* | 6/2019 | Ueno | H02N 2/181 |
| 2005/0184761 | A1* | 8/2005 | Isomura | H03K 17/302 |
| | | | | 327/77 |
| 2005/0285728 | A1* | 12/2005 | Tyndall | B60C 23/0411 |
| | | | | 340/447 |
| 2006/0006850 | A1* | 1/2006 | Inoue | H02J 2207/20 |
| | | | | 323/265 |
| 2009/0278520 | A1* | 11/2009 | Perreault | H02M 3/07 |
| | | | | 323/282 |
| 2010/0079034 | A1* | 4/2010 | Ramadass | H02N 2/181 |
| | | | | 310/339 |
| 2011/0115605 | A1 | 5/2011 | Dimig et al. | |
| 2011/0175461 | A1* | 7/2011 | Tinaphong | H02J 50/20 |
| | | | | 307/149 |
| 2015/0256082 | A1 | 9/2015 | Gudan et al. | |
| 2015/0326142 | A1 | 11/2015 | Petras et al. | |
| 2016/0126909 | A1* | 5/2016 | Vashishtha | H03K 5/2481 |
| | | | | 330/260 |
| 2017/0117818 | A1 | 4/2017 | Shao | |
| 2019/0115458 | A1* | 4/2019 | Chin | H01L 29/1004 |
| 2019/0158072 | A1* | 5/2019 | Tornila Oliver | H03K 3/3565 |
| 2019/0334510 | A1* | 10/2019 | Mattia | H03K 3/011 |
| 2021/0152023 | A1* | 5/2021 | Pearson | H02J 50/20 |

OTHER PUBLICATIONS

Written Opinion for International Application No. PCT/NL2018/050412 filed on Jun. 27, 2018 on behalf of Nowi Energy B.V. Mail Date: Sep. 19, 2018. 7 pages.

* cited by examiner

ENERGY HARVESTER TO CONVERT INCIDENT RADIO FREQUENCY ENERGY TO DIRECT CURRENT AS WELL AS A CORRESPONDING METHOD AND SENSOR COMPRISING THE ENERGY HARVESTER

CROSS REFERENCE TO RELATED APPLICATIONS

The present application is the US national stage of International Patent Application no. PCT/NL2018/050412 filed on Jun. 27, 2018 which, in turn, claims priority to Dutch Patent Application no. 2019135 filed on Jun. 28, 2017.

TECHNICAL FIELD

The present disclosure is generally related to harvesting of energy and, more specifically, to a concept of efficiently storing harvested energy associated with an RF signal.

BACKGROUND

Nowadays, billions of radio frequencies, RF, transmitters are broadcasting RF energy in a continuous manner. For example, mobile telephones, base stations, radio broadcast stations, WiFi access points as well as handheld radios all transmit RF signals. The ability to harvest RF energy, from ambient or dedicated sources, enables wireless charging of, for example, sensor devices.

Energy harvesting, also known as power harvesting or energy scavenging or ambient power, is the process by which energy is derived from external sources, for example Radio Frequency energy, solar power, thermal energy, wind energy, salinity gradients, and kinetic energy, also known as ambient energy, captured, and stored for small, wireless autonomous devices, like those used in wearable electronics and wireless sensor networks.

Energy harvesters provide a very small amount of power for low-energy electronics. While the input fuel to some large-scale generation costs resources (oil, coal, etc.), the energy source for energy harvesters is present as ambient background. For example, temperature gradients exist from the operation of a combustion engine and in urban areas, there is a large amount of electromagnetic energy in the environment because of radio and television broadcasting.

The present disclosure is explicitly directed to the harvesting of energy from RF energy associated with an RF signal.

The concept of harvesting RF energy is already known. One of the challenges in this field is to improve the energy harvesting. That is, the RF energy received at an antenna should be converted and/or stored as efficiently as possible. Preferably, the RF energy should be converted and stored such that no battery is required any more. All the energy for operating the device, for example the sensor, is then obtained from the RF signals.

Following the above, it is a drawback of the known energy harvesters that the received RF power is not converted and stored efficiently.

SUMMARY

It would be advantageous to achieve an energy harvester that is able to efficiently convert and store Radio Frequency, RF, energy associated with an RF signal. It would also be desirable to achieve a corresponding method as well as a sensor device comprising such an energy harvester.

To better address one or more of these concerns, in a first aspect of the disclosure, an energy harvester is provided to convert incident radio frequency, RF, energy associated with an RF signal to direct current energy.

The energy harvester comprising:
a rectifier comprising a pre-storage capacitor, wherein said rectifier is arranged to rectify said incoming incident RF energy thereby storing said RF energy into said pre-storage capacitor;
an energy transfer unit comprising a storage output capacitor, wherein a capacitance value of said storage output capacitor is higher than a capacitance value of said pre-storage capacitor, and wherein said energy transfer unit is arranged to transfer said energy in said pre-storage capacitor into said storage output capacitor;
a control unit arranged for controlling said energy transfer unit, wherein said control unit is arranged to measure a voltage over said pre-storage capacitor, and wherein said control unit is further arranged to:
   activate said energy transfer unit to start transferring said energy in said pre-storage capacitor into said storage output capacitor when said measured voltage is above a first voltage threshold.
wherein said energy transfer unit is deactivated whenever said voltage over said pre-storage capacitor falls below a second voltage threshold, wherein said first voltage threshold is higher than said second voltage threshold and wherein:
said pre-storage capacitor has a capacitance value of between 100 picofarad, pF, and 100 nanofarad, nF;
said storage output capacitor has a capacitance value of between 1 microfarad, µF, and 100 millifarad, mF.

The present disclosure is based on the concept that the RF energy associated with an RF signal is relatively low. This energy is rectified by the rectifier and stored in the pre-storage capacitor. The pre-storage capacitor will thus be energized via the RF energy associated with the RF signal.

The inventors have found that the pre-storage capacitor does not form a stable voltage reference point. A stable voltage reference point is, however, preferred as an input signal for any Direct Current, DC, to DC converter.

As such, it was one of the insights that a stable voltage reference point should be created, which stable voltage reference point can be used as an input for any DC to DC converter connected thereto.

The above is realized using the energy transfer unit. The energy transfer unit is arranged to transfer the energy comprised by the pre-storage capacitor to the storage output capacitor. The storage output capacitor forms a stable voltage reference point as the capacitance value of the storage output capacitor is higher than the capacitance value of the pre-storage capacitor.

The operation of the energy transfer unit is controlled based on the voltage over the pre-storage capacitor. That is, the energy transfer unit is activated once the voltage over the pre-storage capacitor exceeds a certain first voltage threshold. The voltage over the pre-storage capacitor thus effectively forms a trigger for activating the energy transfer unit. Once the energy transfer unit is activated, the charge present in the pre-storage capacitor will be transferred to the output capacitor. In doing so, the voltage over the pre-storage capacitor will drop automatically. The inventors have found that the energy transfer unit is operating efficiently in case its operation is controlled based on the input voltage, i.e. the pre-storage capacitor.

The energy transfer unit will be deactivated once the voltage over the pre-storage capacitor will drop to below a certain second voltage threshold (or drop to substantially zero volts), wherein the first voltage threshold is higher than the second voltage threshold. This may be accomplished by simply a depletion process of the pre-storage capacitor. For example, the energy transfer unit may be deactivated automatically once the pre-storage capacitor is depleted, or substantially depleted. Other means may be implemented to actively deactivate the energy transfer unit by detecting that the voltage over the pre-storage capacitor drops to below the second voltage threshold. These means will be explained in more detail further below.

The control unit is thus arranged to actually measure the voltage over the pre-storage capacitor, and to act according to its obtained measurement. There is no ohmic component, or other like FET or the like, in the current path between the pre-storage capacitor and the energy transfer unit, which could reduce the efficient of the harvester.

It is noted that the above described process results in a periodic charging of the storage output capacitor. The above results in the fact that the value of the storage output capacitor may be chosen much higher compared to the value of the pre-storage capacitor. This again results in a much more stable voltage reference point for any DC to DC converter that is connected thereto.

In accordance with the present disclosure, the energy transfer unit is arranged to transfer the energy from the pre-storage capacitor to the storage output capacitor. The energy transfer unit may also be arranged to boost the voltage over the pre-storage capacitor to a higher voltage, such that the voltage over the storage output capacitor exceeds the voltage over the pre-storage capacitor.

In an example, the control unit is further arranged to:
deactivate said energy transfer unit to stop transferring said energy in said pre-storage capacitor into said storage output capacitor when said measured voltage is below a second voltage threshold;
wherein said first voltage threshold is higher than said second voltage threshold.

Here, the control unit is arranged to actively deactivate the energy transfer unit when the measured voltage drops to below the second voltage threshold. This may ensure proper functioning of the energy transfer unit.

In accordance with the present disclosure, at least one of:
said pre-storage capacitor has a capacitance value of between 100 picofarad, pF, and 100 nanofarad, nF, and
said storage output capacitor has a capacitance value of between 1 micro-farad, μF, and 100 milli-farad, mF.

It was found that it is advantageous if the values for the pre-storage capacitor and the storage output capacitor fall within the range as indicated above. The value for the storage output capacitor of between 1 microfarad, μF, and 10 millifarad, mF ensures that the storage output capacitor can be used as a stable reference point for any DC to DC converter connected thereto.

In an example, the energy harvester comprises a power management unit, connected to the storage output capacitor, wherein the power management unit is arranged to convert a voltage over the storage output capacitor to an operating DC voltage.

The operating DC voltage is thus the operating voltage of the energy harvester. It may be used as a standard DC voltage to which other components are connected. The power management unit is typically arranged to boost the voltage over the pre-storage capacitor. The inventors have found that such a voltage converter operates efficiently whenever the input forms a stable voltage reference point. This is established using the energy transfer unit of the present disclosure, wherein the energy transfer unit comprises the storage output capacitor having a value of between 1 microfarad and 100 millifarad.

In a detailed embodiment hereof, the control unit is further arranged to measure a voltage over the storage output capacitor, and wherein the control unit is further arranged to:
activate the power management unit to start converting the voltage over the storage output capacitor to the operating DC voltage when the measured voltage over the storage output capacitor is above a predetermined threshold.

The advantage of the embodiment described above is that the efficiency of the energy harvester may be improved by activating the power management unit only when the voltage over the storage output capacitor is above the predetermined threshold. As such, the power management unit is only activated when the voltage over the storage output capacitor, i.e. the stable reference point, is above the predetermined threshold.

In another example, said energy transfer unit comprises:
a low-power oscillator, connected to said pre-storage capacitor, wherein said low-power oscillator is arranged to provide for an oscillation output signal based on said energy stored in said pre-storage capacitor;
an Alternating Current, AC, to Direct Current, DC, converter connected to said low-power oscillator and to said storage output capacitor, wherein said AC-to-DC converter is arranged for converting said oscillation output signal to a DC output signal, wherein said DC output signal is provided to said storage output capacitor,
wherein said control unit is arranged to activate and deactivate said energy transfer unit by activating and deactivating said low-power oscillator.

The above describes a typical example of an implementation of the energy transfer unit. Effective transfer of energy from the pre-storage capacitor to the storage output capacitor can be obtained using the combination of a low-power oscillator and an AC to DC converter.

In an example, said energy transfer unit comprises:
a switched-mode boost converter for boosting said voltage over said pre-storage capacitor thereby obtaining a boosted voltage over said storage output capacitor.

It is noted that the energy transfer unit may also comprise any other type of DC-DC converter for transferring the energy from the pre-storage capacitor to the storage output capacitor.

In a further example, said energy harvester further comprises a battery or harvested energy for supplying energy to said control unit.

In an example, said energy harvester comprises a power management unit, connected to said storage output capacitor, wherein said power management unit is arranged to convert a voltage over said storage output capacitor to an operating DC voltage.

In another example, said rectifier comprises one or more diodes selected from a group comprising a Schottky diode, a PN junction diode, a diode-connected field effect transistor and a tunnel diode. It is noted that the rectifier may comprise any components, i.e. besides diode, for performing the rectifying operation.

In an example, said control unit comprises an operational amplifier, op-amp, comparator with hysteresis for providing said first voltage threshold and said second voltage threshold.

In a further example, the energy harvester further comprises:

a bypass switch for bypassing the energy transfer unit;

wherein the control unit is further arranged for determining that the incoming incident energy is non-fluctuating based on the measured voltage over the pre-storage capacitor, and for activating the bypass switch based on the determination.

It was one of the insights of the inventors that the energy transfer unit is mainly used when the input energy is originating has fluctuating characteristics. In case the input energy is non-fluctuating it may be better to bypass the energy transfer unit. In such a case, the pre-storage capacitor may form a stable reference The expressions, i.e. the wording, of the different aspects comprised by the method and devices according to the present disclosure should not be taken literally. The wording of the aspects is merely chosen to accurately express the rationale behind the actual functioning of the aspects.

In accordance with the present disclosure, different aspects applicable to the above mentioned examples of the energy harvester, including the advantages thereof, correspond to the aspects which are applicable to the corresponding methods.

In a second aspect, there is provided a sensor device comprising:
an energy harvester according to any of the previous claims;
an antenna connected to said rectifier, wherein said antenna is arranged for receiving said RF signal;
a sensor for performing a measurement.
In an example, the sensor device further comprises:
a controller arranged for measuring said operating DC voltage, and for initiating said sensor to perform said measurement and for transmitting a performed measurement whenever a measured operating DC voltage exceeds a predetermined operating voltage.

In a third aspect, there is provided a method of converting incident radio frequency, RF, energy associated with an RF signal to direct current energy using an energy harvester in according with any of the examples as provided above, said method comprising the steps of:
rectifying, by said rectifier, said incoming incident RF energy thereby storing said RF energy into said pre-storage capacitor;
transferring, by said energy transfer unit, said energy in said pre-storage capacitor into said storage output capacitor;
controlling, by said control unit, said energy transfer unit, wherein said controlling comprises measuring a voltage over said pre-storage capacitor, and wherein said controlling further comprises:
activating said energy transfer unit to start transferring said energy in said pre-storage capacitor into said storage output capacitor when said measured voltage is above a first voltage threshold;
deactivating said energy transfer unit to stop transferring said energy in said pre-storage capacitor into said storage output capacitor when said measured voltage is below a second voltage threshold (or to substantially zero volts);
wherein said first voltage threshold is higher than said second voltage threshold.

In an example, at least one of
said pre-storage capacitor has a capacitance value of between 100 picofarad, pF, and 100 nanofarad, nF;
said storage output capacitor has a capacitance value of between 1 microfarad, µF, and 100 millifarad, mF.

The above-mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
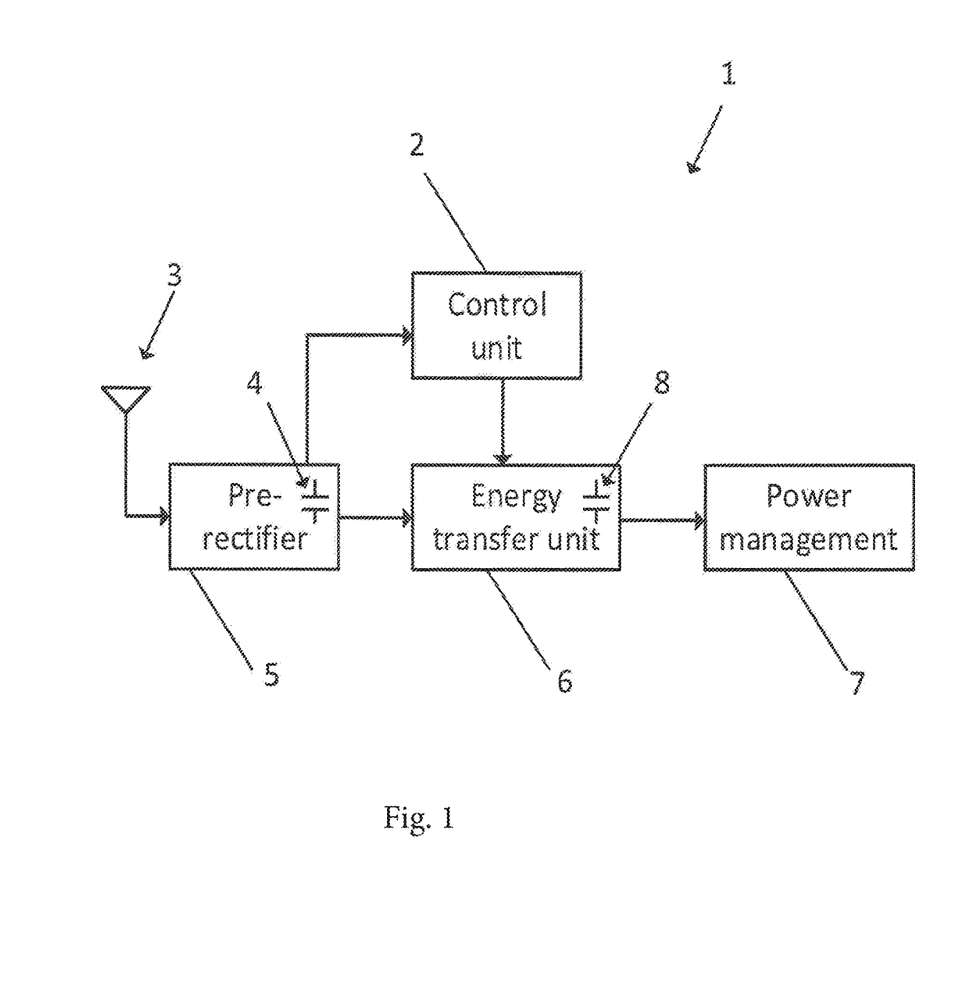
FIG. 1 shows a high level block diagram illustrating an energy harvester in accordance with the present disclosure.

FIG. 1 shows a high level block diagram 1 illustrating an energy harvester in accordance with the present disclosure. In FIG. 1, the energy harvester is made up of the blocks as indicated with reference numerals 2, 4, 5, 6 and 8.

The energy harvester is arranged to convert incident radio frequency, RF, energy associated with an RF signal to direct current energy. The corresponding RF signals are picked up by an antenna 3. The antenna 3 thus receives all kinds of RF signals, for example Bluetooth related signalling, mobile telephone related signalling, Wi-Fi related signalling and so on.

The present disclosure is directed to the concept that the RF energy associated with an RF signal can be used for energy harvesting. The energy that can be harvested from RF signals is typically quite low. As such, it is beneficial if the harvesting part is performed efficiently such that as less energy as possible gets lost during the process. The energy harvester of the present disclosure is directed to an efficient way to harvest the energy present in RF signals.

The energy harvester in accordance to the present disclosure may be used in, for example, wireless sensor devices. Wireless sensor devices are used for, for example, performing a sensor measurement, and for providing said measurement, wirelessly, to a gateway or the like. The harvesting part of such a wireless sensor device is arranged to continuously harvest energy from the RF signals. Once sufficient energy is harvested, the wireless sensor device may decide to perform the measurement and to transmit the performed measurement to the gateway. Typically, the harvesting may take quite some time before sufficient energy is available. For example, the harvesting may take up to a couple of hours, or even days, before a sufficient energy level is reached.

The energy harvester comprises a rectifier 5, comprising a pre-storage capacitor 4, wherein the rectifier 5 is arranged to rectify the incoming incident RF energy, thereby storing the RF energy into the pre-storage capacitor 4. The pre-storage capacitor 4 is typically a small sized capacitor as the RF energy is relatively low.

The energy harvester further comprises an energy transfer unit 6 comprising a storage output capacitor 8, wherein a capacitance value of said storage output capacitor is higher than a capacitance value of said pre-storage capacitor 4, and wherein said energy transfer unit 6 is arranged to transfer said energy in said pre-storage capacitor 4 into said storage output capacitor 8.

It is noted that pre-storage capacitor has a capacitance value of between 100 picofarad, pF, and 100 nanofarad, nF, and that said storage output capacitor has a capacitance value of between 1 microfarad, μF, and 100 millifarad, mF.

The advantage hereof is that a stable reference point is created, i.e. formed by the storage output capacitor 8, for connecting DC-DC voltage converters, for example a power management unit.

Finally, the energy harvester comprises a control unit 2 arranged for controlling said energy transfer unit 6, wherein said control unit 2 is arranged to measure a voltage over said pre-storage capacitor 4, and wherein said control unit 2 is further arranged to:

activate said energy transfer unit 6 to start transferring said energy in said pre-storage capacitor 4 into said storage output capacitor 8 when said measured voltage is above a first voltage threshold.

Here, the energy transfer unit 6 is deactivated whenever said voltage over said pre-storage capacitor 4 falls below a second voltage threshold (or substantially zero volts), wherein said first voltage threshold is higher than said second voltage threshold.

Finally, the energy harvester may comprise a power management unit 7, connected to said storage output capacitor 8, wherein said power management unit 7 is arranged to convert a voltage over said storage output capacitor 8 to an operating DC voltage.

Preferably, the rectifier 5 comprises passive components for rectifying the received RF energy. The rectifier 5 may comprise one or more diodes selected from a group comprising a Schottky diode, a PN junction diode, a diode-connected field effect transistor and a tunnel diode. Any other type of rectifier suitable for rectifying the received RF signal may suffice.

Figure 2:
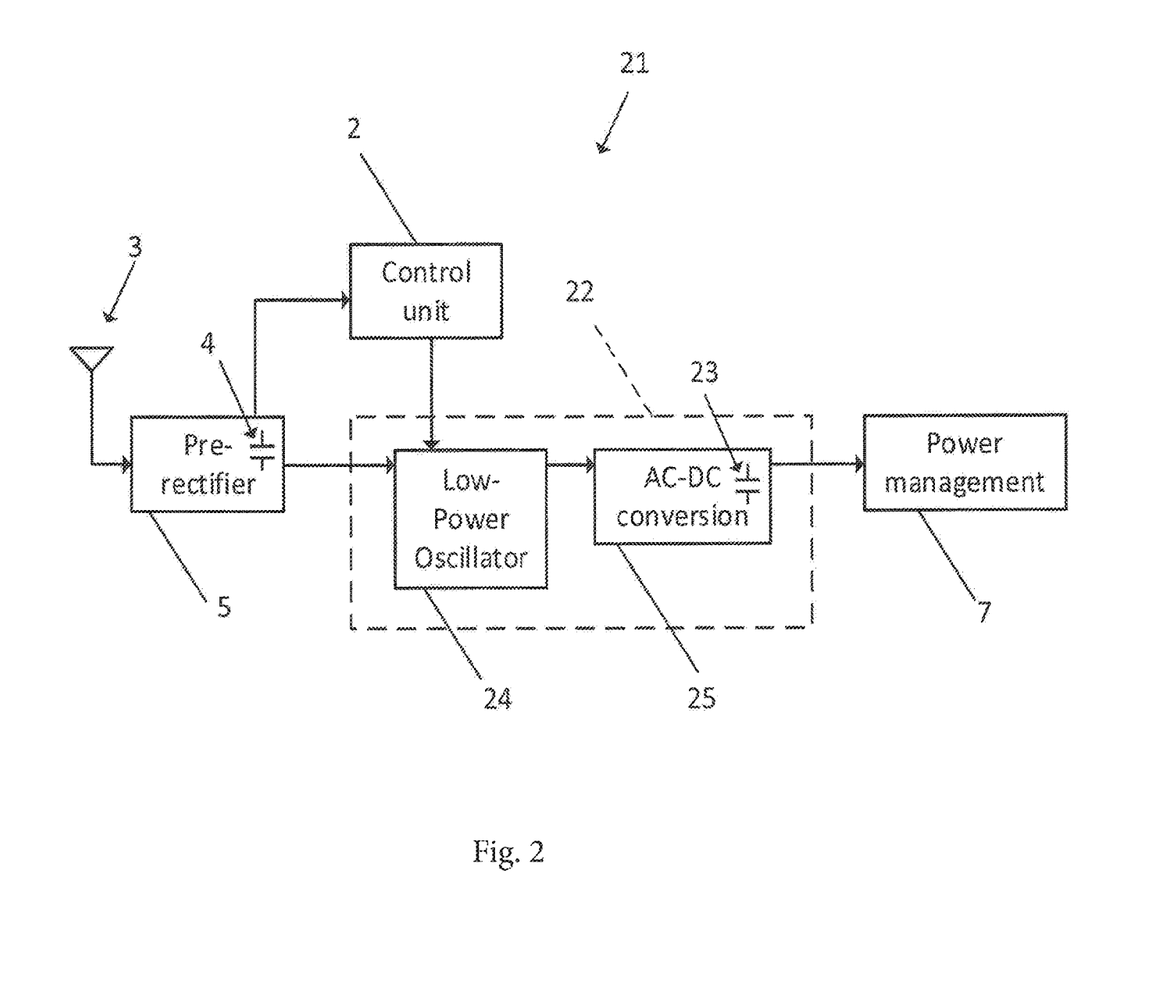
FIG. 2 shows a block diagram illustrating an energy harvester in accordance with the present disclosure.

FIG. 2 shows a block diagram 21 illustrating an energy harvester in accordance with the present disclosure.

Here, a specific implementation of the energy transfer unit 22 is depicted. The energy transfer unit 22 comprises a low-power oscillator 24 as well as an Alternating Current, AC, to Direct Current, DC, conversion unit 25. The control unit 2 is arranged to sense the voltage across the pre-storage capacitor 4 and is arranged to control, i.e. activate, the low power oscillator 24. The activating of the low power oscillator is performed based on the sensed voltage across the pre-storage capacitor 4. That is, the control unit 2 is arranged to activate the low power oscillator 24 whenever the sensed voltage across the pre-storage capacitor 4 is above a first voltage threshold. The first voltage threshold is, for example, in the range of 10-100 mV.

The low power oscillator 24 will then start with providing an oscillator output signal. The oscillator output signal is provided to the AC-DC conversion unit 25, which AC-DC conversion unit 25 is arranged to convert that signal to a DC voltage, which DC voltage is stored in the storage output capacitor 23. The above described implementation for the energy transfer unit 22 is advantageous as it is an efficient way to transfer energy from the pre-storage capacitor 4 into the storage output capacitor 23.

Figure 3:
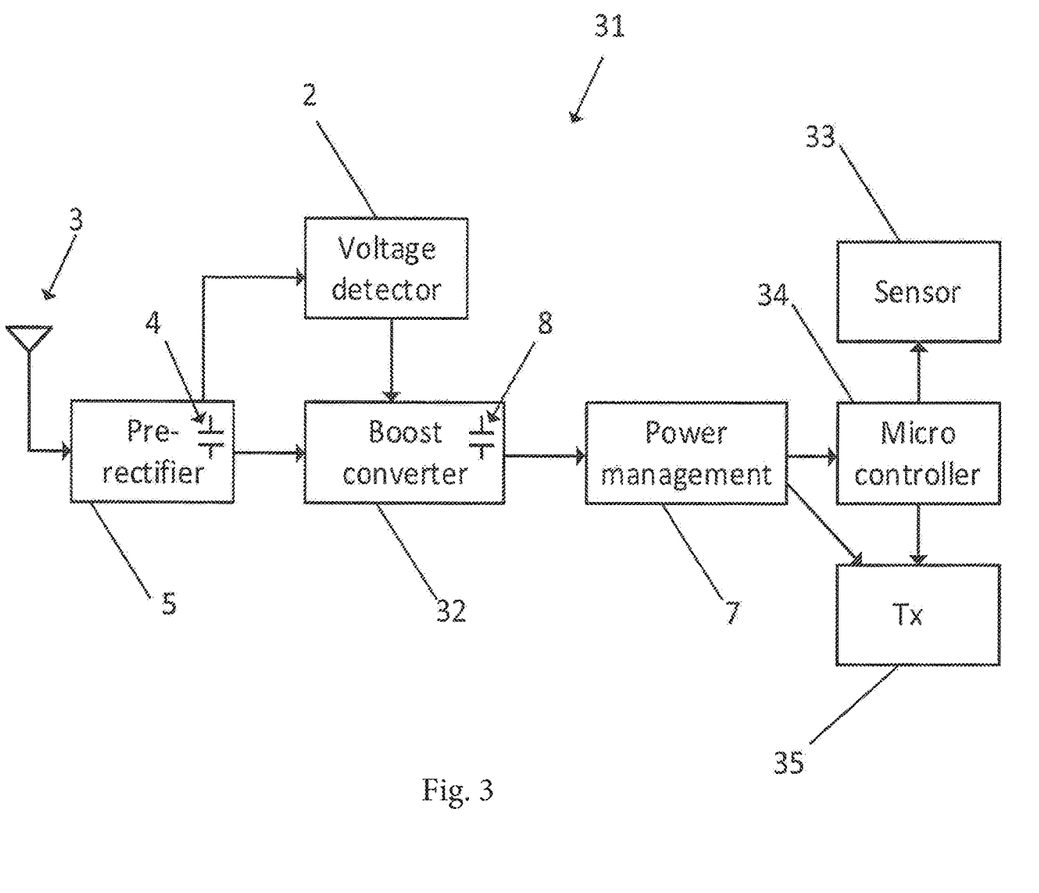
FIG. 3 shows a block diagram illustrating a sensor device in accordance with the present disclosure.

FIG. 3 shows a block diagram illustrating a sensor device in accordance with the present disclosure.

The sensor device 31 comprising an energy harvester as explained with respect to FIGS. 1 and 2, an antenna 3 connected to said rectifier 5, wherein said antenna 3 is arranged for receiving said RF signal, and a sensor 33 for performing a measurement.

Correct operation of the sensor device 31 may be controlled by the micro controller 34. The micro controller 34 is empowered by the power management 7 and may initiate the sensors 33 for performing the sensor measurement and may initiate a transmit module for transmitting a performed sensor measurement. The inventors have found that a Bluetooth low energy module 35 may be a suitable choice for the sensor device 31. The Bluetooth low energy module 25 may use the same antenna as is used for the harvesting of energy, i.e. as indicated with reference numeral 3. Alternatively, the Bluetooth low energy module 25 may use a dedicated antenna, i.e. as indicated with reference numeral 36.

Figure 4:
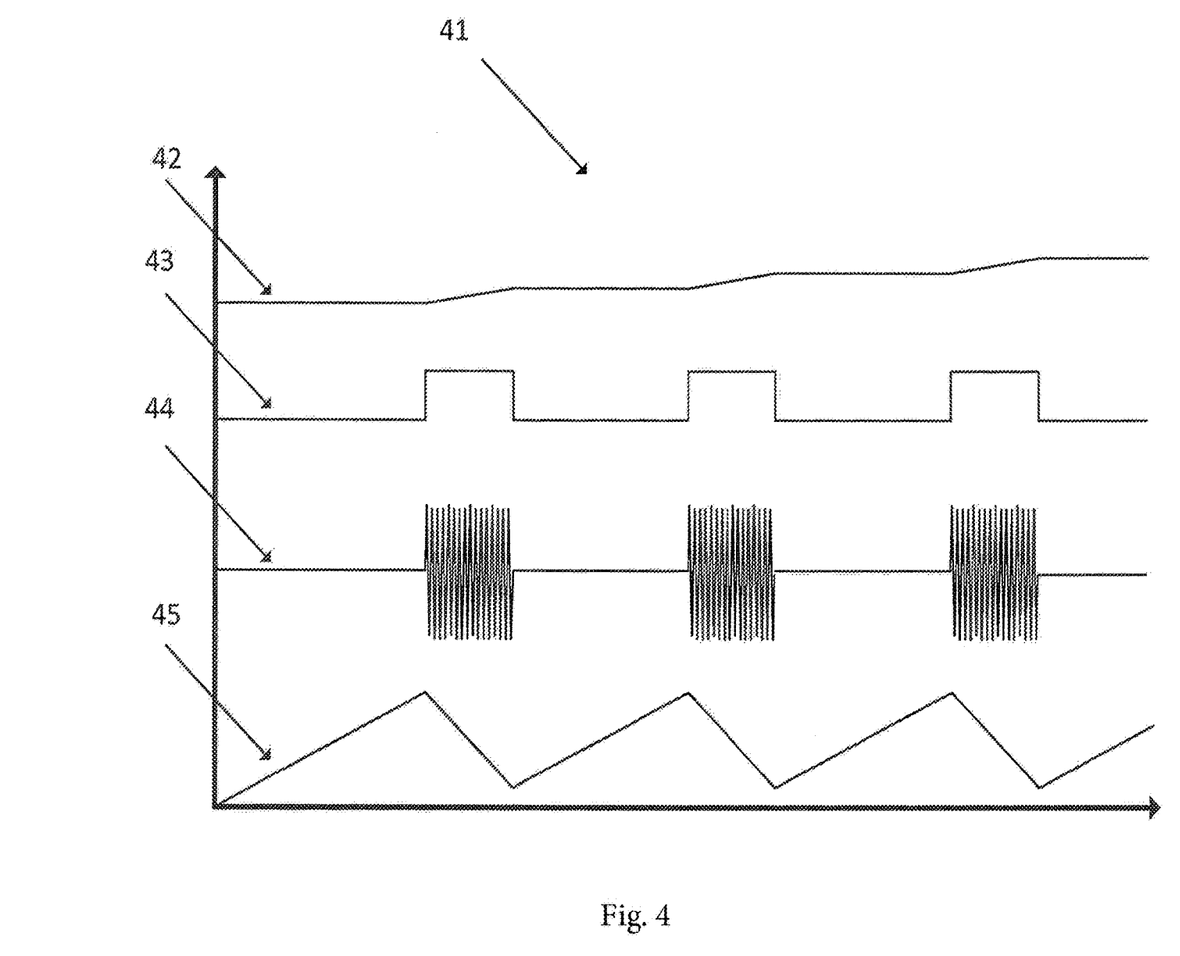
FIG. 4 shows a voltage diagram corresponding to an energy harvester in accordance with the present disclosure.

FIG. 4 shows a voltage diagram 41 corresponding to an energy harvester in accordance with the present disclosure.

Here, four different waveforms 42, 43, 44, 45 are depicted. The waveform indicated with reference numeral 45 is related to the voltage across the pre-storage capacitor. The waveform indicated with reference numeral 44 is related to the output of the low power oscillator as depicted in FIG. 2. The waveform indicated with reference numeral 43 is related to the control signal for activating the energy transfer unit. Finally, the waveform indicated with reference numeral 42 is related to the voltage across the storage output capacitor.

Here, it is shown that the voltage over the pre-storage capacitor increases due to energy that is harvested from any RF signalling received by the antenna. It is noted that in the present figure, the voltage over the pre-storage capacitor is increasing smoothly. In practice, however, the voltage does not increase as smoothly as shown in FIG. 4. One of the reasons is that the incident RF signalling is not constant over time. It may happen that the energy harvester receives a lot of energy at a certain point in time, but does not receive a lot of energy at a different point in time. This depends on the activity of RF transmitters in the neighbourhood of the energy harvester. As such, the slope of the waveform 45 may differ.

The energy transfer unit is activated once the voltage across the pre-storage capacitor is above a first voltage threshold. This is depicted by the control signal 43 and the low power oscillator output signal 44.

The control signal may be generated by an Operational Amplifier cascaded as an OpAmp. The OpAmp may compare the voltage across the pre-storage capacitor with the first voltage threshold.

The energy is transferred from the pre-storage capacitor to the storage output capacitor once the energy transfer unit is activated. As such, the voltage across the storage output capacitor increases during the activity period of the energy transfer unit.

Figure 5:
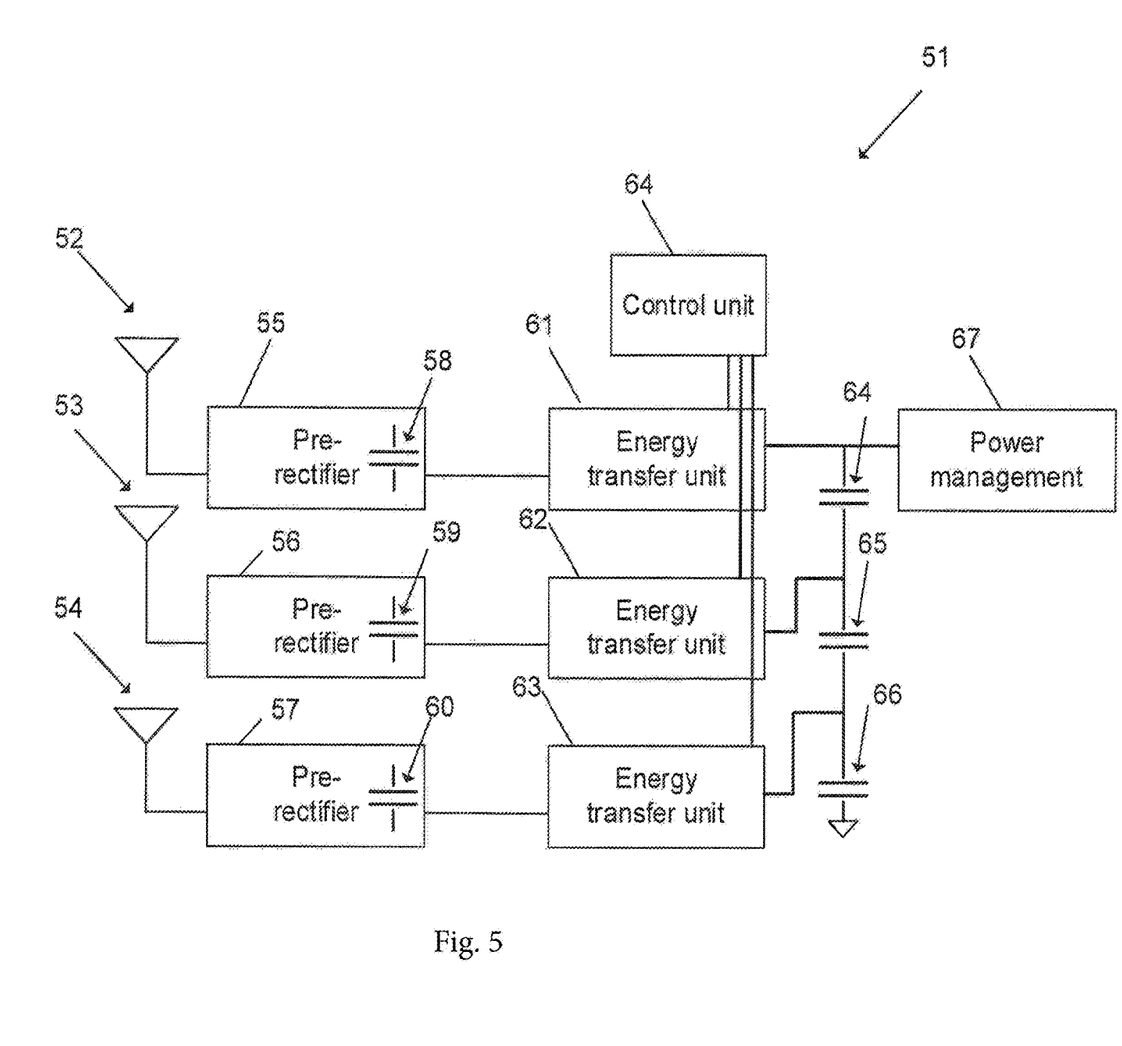
FIG. 5 shows another block diagram illustrating an energy harvester in accordance with the present disclosure.

FIG. 5 shows another block diagram 51 illustrating an energy harvester in accordance with the present disclosure.

Here, the energy harvester comprises three antennas 52, 53, 54. Each of these antennas 52, 53, 54 may be tuned to a different frequency. A first antenna 52 may be tuned to 5 GHz, a second antenna 53 may be tuned to 2.4 GHz and a third antenna 54 may be tuned to 1.8 GHz.

The first antenna 52 is coupled to a first rectifier 55 having a first pre-storage capacitor 58. The second antenna 53 is coupled to a second rectifier 56 having a second pre-storage capacitor 59. The third antenna 54 is coupled to a third rectifier 57 having a third pre-storage capacitor 60.

The first rectifier 55 is connected to a first energy transfer unit 61 comprising a first storage output capacitor 64, wherein a capacitance value of said first storage output capacitor 64 is higher than a capacitance value of said first pre-storage capacitor 58, and wherein said first energy transfer unit 61 is arranged to transfer said energy in said first pre-storage capacitor 58 into said storage output capacitor 64.

The second rectifier 56 is connected to a second energy transfer unit 62 comprising a second storage output capacitor 65, wherein a capacitance value of said second storage output capacitor 65 is higher than a capacitance value of said second pre-storage capacitor 59, and wherein said second energy transfer unit 62 is arranged to transfer said energy in said second pre-storage capacitor 59 into said second storage output capacitor 65.

The third rectifier 57 is connected to a third energy transfer unit 63 comprising a third storage output capacitor 66, wherein a capacitance value of said third storage output capacitor 66 is higher than a capacitance value of said third pre-storage capacitor 60, and wherein said third energy transfer unit 63 is arranged to transfer said energy in said third pre-storage capacitor 60 into said third storage output capacitor 63.

It is noted that each of the storage output capacitors 64, 65, 66 are connected in series, and are connected to the power management unit 67. The advantage hereof is that, by having parallel energy transfer units, each of the harvester components operate individually.

Figure 6:
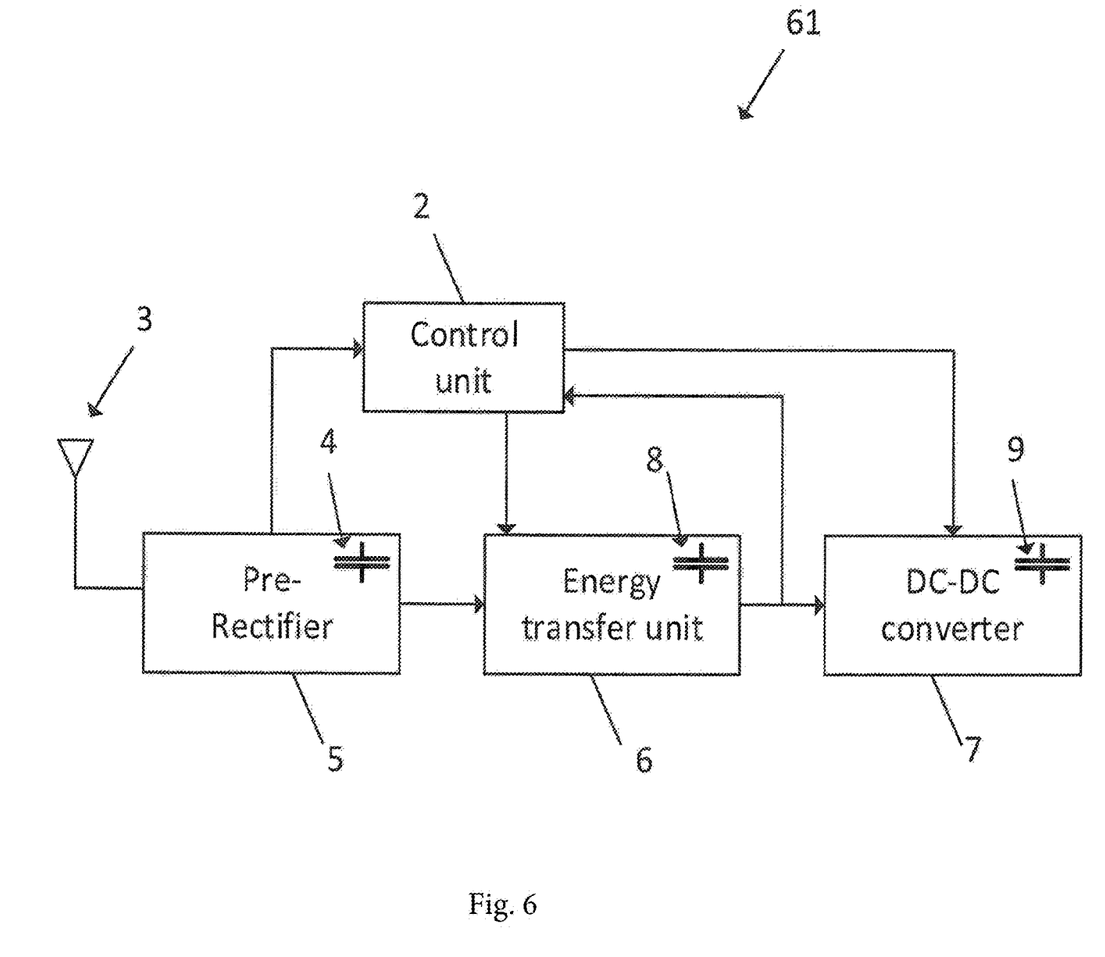
FIG. 6 shows a further block diagram illustrating an energy harvester in accordance with the present disclosure.

FIG. 6 shows a further block diagram 61 illustrating an energy harvester in accordance with the present disclosure. Here the same reference numerals are used as for the other figures.

The power management unit 7 is formed by a DC-DC converter 7. The DC-DC converter 7, for example a boost converter, convert the voltage over the storage output capacitor to an operating voltage capacitor 9. The operating voltage capacitor 9 is used for supply an operating supply voltage.

The Dc-DC converter may be controlled, by the control unit 2, based on the voltage measured over the storage output capacitor 8. That is, once the voltage over the storage output capacitor exceeds a predetermined threshold, the DC-DC converter 7 may be activated to ensure that the DC-DC converter 7 operates in an efficient domain.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. An energy harvester to convert incident radio frequency, RF, energy associated with an RF signal received by an antenna to direct current energy, the energy harvester comprising:
   a rectifier coupled to the antenna, the rectifier comprising a pre-storage capacitor, wherein said rectifier is arranged to rectify said incoming incident RF energy thereby storing said RF energy into said pre-storage capacitor;
   an energy transfer unit comprising a storage output capacitor storing said energy at a stable voltage reference point as an input for a DC to DC converter connected thereto, wherein a capacitance value of said storage output capacitor is higher than a capacitance value of said prestorage capacitor, and wherein said energy transfer unit is arranged to transfer said energy in said pre-storage capacitor into said storage output capacitor;
   a control unit arranged for controlling said energy transfer unit, wherein said control unit is arranged to measure a voltage over said pre-storage capacitor, and wherein said control unit is further arranged to:
      activate said energy transfer unit to start transferring said energy in said prestorage capacitor into said storage output capacitor when said measured voltage is above a first voltage threshold, wherein said energy transfer unit is deactivated whenever said voltage over said prestorage capacitor falls below a second voltage threshold, wherein said first voltage threshold is higher than said second voltage threshold and wherein:
   said pre-storage capacitor has a capacitance value of between 100 picofarad, pF, and 100 nanofarad, nF;
   said storage output capacitor has a capacitance value of between 1 microfarad, pF, and 100 millifarad, mF;
   wherein said energy harvester comprises a power management unit, connected to said storage output capacitor, wherein said power management unit is arranged to convert a voltage over said storage output capacitor to an operating DC voltage; and
   wherein said RF signal comprises a frequency content in a range from 1.8 GHz to 5 GHz.

2. The energy harvester in accordance with claim 1, wherein said control unit is further arranged to measure a voltage over said storage output capacitor, and wherein said control unit is further arranged to:
   activate said power management unit to start converting said voltage over said storage output capacitor to said operating DC voltage when said measured voltage over said storage output capacitor is above a predetermined threshold.

3. The energy harvester according to claim 1, wherein said control unit is further arranged to:
   deactivate said energy transfer unit to stop transferring said energy in said pre-storage capacitor into said storage output capacitor when said measured voltage is below a second voltage threshold;
   wherein said first voltage threshold is higher than said second voltage threshold.

4. The energy harvester according to claim 1, wherein said energy transfer unit comprises:
   a low-power oscillator, connected to said pre-storage capacitor, wherein said low-power oscillator is arranged to provide for an oscillation output signal based on said energy stored in said pre-storage capacitor;

an Alternating Current, AC, to Direct Current, DC, converter connected to said low-power oscillator and to said storage output capacitor, wherein said AC-to-DC converter is arranged for converting said oscillation output signal to a DC output signal, wherein said DC output signal is provided to said storage output capacitor, wherein said control unit is arranged to activate and deactivate said energy transfer unit by activating and deactivating said low-power oscillator.

5. The energy harvester according to claim 1, wherein said power management unit comprises:

a switched-mode boost converter for boosting said voltage over said pre-storage capacitor thereby obtaining a boosted voltage over said storage output capacitor.

6. The energy harvester according to claim 1, wherein said energy harvester further comprises a battery or harvested energy for supplying energy to said control unit.

7. The energy harvester according to claim 1, wherein said rectifier comprises one or more diodes selected from a group comprising a Schottky diode, a PN junction diode, a diode-connected field effect transistor and a tunnel diode.

8. The energy harvester according to claim 1, wherein said control unit comprises an operational amplifier, op-amp, comparator with hysteresis for providing said first voltage threshold and said second voltage threshold.

9. The energy harvester according to claim 1, wherein said harvester further comprises:

a bypass switch for bypassing said energy transfer unit; wherein said control unit is further arranged for determining that said incoming incident energy is non-fluctuating based on said measured voltage over said pre-storage capacitor, and for activating said bypass switch based on said determination.

10. The energy harvester according to claim 1, wherein a boost factor of said power management unit is controllable, and wherein said controller is arranged to control said boost factor.

11. A sensor device comprising:

the energy harvester according to claim 1; and a sensor for performing a measurement.

12. The sensor device according to claim 11, wherein said energy harvester comprises a power management unit, connected to said storage output capacitor, wherein said power management unit is arranged to convert a voltage over said storage output capacitor to an operating DC voltage, wherein said sensor device further comprises:

a controller arranged for measuring said operating DC voltage, and for initiating said sensor to perform said measurement and for transmitting a performed measurement whenever a measured operating DC voltage exceeds a predetermined operating voltage.

13. A method of converting incident radio frequency, RF, energy associated with an RF signal received by an antenna to direct current energy using the energy harvester according to claim 1, said method comprising the steps of:

rectifying, by said rectifier, said incoming incident RF energy thereby storing said RF energy into said pre-storage capacitor; transferring, by said energy transfer unit, said energy in said pre-storage capacitor into said storage output capacitor; controlling, by said control unit, said energy transfer unit, wherein said controlling comprises measuring a voltage over said pre-storage capacitor, and wherein said controlling further comprises:

activating said energy transfer unit to start transferring said energy in said prestorage capacitor into said storage output capacitor when said measured voltage is above a first voltage threshold; deactivating said energy transfer unit to stop transferring said energy in said prestorage capacitor into said storage output capacitor when said measured voltage is below a second voltage threshold; wherein said first voltage threshold is higher than said second voltage threshold.

* * * * *